Patented Aug. 13, 1946

2,405,820

UNITED STATES PATENT OFFICE 2,405,820

PRODUCTION OF METHYL FORMYL-CHLOROACETATE

Herman Eldridge Faith, Indianapolis, Ind., assignor to Allied Laboratories, Inc., Kansas City, Mo., a corporation of Delaware No Drawing. Application January 19, 1944, Serial No. 518,868

7 Claims. (Cl. 260—483)

This invention relates to the production of methyl formylchloroacetate and alkali metal salts thereof.

In the past it has been proposed to prepare 2-sulfanilamido thiazole by the decarboxylation of 2-sulfanilamido-5-carboxythiazole. In the production of 2-sulfanilamido-5-carboxythiazole, one of the intermediates employed was 2-amino-5-carboethoxythiazole. The 2-amino-5-carboethoxythiazole was produced by condensing ethyl formylchloroacetate with thiourea. The ethyl formylchloroacetate was prepared in accordance with a procedure described by Wislicenus (Ber. 43, 3530 (1910)) who condensed ethyl formate with ethyl chloroacetate in an ether alcohol solution and in the presence of potassium metal.

I have now found that 2-sulfanilamido-5-carboxythiazole is an effective bacteriostatic agent and that it possesses advantages over 2-sulfanilamido thiazole in certain instances.

I have also determined that the method described by Wislicenus (Ber. 43, 3530 (1910)) for the preparation of ethyl formylchloroacetate is not entirely satisfactory for large scale production. In the Wislicenus process, wherein the reaction between ethyl formate and ethyl chloroacetate is carried out in ether alcohol and in the presence of potassium metal, the reaction mixture forms a pasty mass that is extremely difficult to stir. In addition the use of the hazardous reagents potassium or sodium and ether offer many disadvantages from a commercial standpoint.

In accordance with the present invention, I have discovered that the new compounds methyl formylchloroacetate and alkali metal salts thereof are extremely valuable as intermediates for the production of 2-amino-5-carboxythiazole. Their value is enhanced by their unexpected and surprisingly different physical properties from those of the related ethyl formylchloroacetate. For example, the sodium salt of ethyl formylchloroacetate forms a pasty mass in toluene suspension that can only be stirred with extreme difficulty. On the other hand, the sodium salt of methyl formylchloroacetate forms a suspension in toluene that can very easily be stirred, even when less toluene is employed.

I have further discovered a process for the production of methyl formylchloroacetate on a large scale which avoids the disadvantages of the prior art process for the production of ethyl formylchloroacetate. In accordance with my process methyl chloroacetate and methyl formate are caused to react in a toluene solution in the presence of an alkali metal methylate. In general my process is carried out by mixing methyl chloroacetate and methyl formate in cold toluene. Sodium methylate is then added to this mixture. During the addition of the sodium methylate, the mixture is maintained in at a relatively low temperature, preferably below 5° C., and uniformly mixed by stirring. The reaction is usually completed in about two hours. In many cases, however, the reaction period is continued for 4 or more hours. In all cases the reaction mixture remains fluid and is easily stirred.

The sodium salt of the methyl formylchloroacetate formed in the above reaction may be isolated if desired. In most instances, it would be desirable to isolate the methyl formylchloroacetate, inasmuch as it can be more readily purified. The methyl formylchloroacetate is readily liberated by neutralization of an aqueous solution of the sodium salt, with a suitable inorganic acid such as for example hydrochloric, after which the methyl formylchloroacetate may be recovered by extraction with toluene or ether.

When it is desired to utilize my compounds as intermediates for the production of 2-amino-5-carbomethoxythiazole, it is not necessary to carry out any preliminary purification steps since good yields may be obtained by condensing an aqueous suspension of methyl formylchloroacetate directly with thiourea.

My invention will be more specifically illustrated by the following specific examples, the examples being given by way of illustration not by way of limitation.

Example 1

54.4 g. of methyl chloroacetate and 31.6 g. of methyl formate were dissolved in 110 cc. of toluene cooled to about 0° C. 28.5 g. of sodium methylate was then added, the rate of addition being such that the temperature of the reaction mixture did not exceed 5° C. The reaction mixture was stirred during the sodium methylate addition and continued for about 4 hours afterwards. The temperature was maintained at from 0° to 5° C. The reaction mixture remained fluid and was easily stirred during the entire reaction period.

The sodium methyl formylchloroacetate formed by the reaction was dissolved by stirring the reaction mixture with a convenient volume of water and the aqueous solution separated from the toluene layer. The aqueous solution of the salt was extracted once with toluene and twice with ether to remove any unreacted reagents. The aqueous solution was then neutralized with hydrochloric acid, about 30 cc. being required. The methyl formylchloroacetate layer was recovered by extraction with ether and dried. After the ether had been evaporated, the methyl formylchloroacetate was fractionally distilled. The material distilled over at a range of 40° C. to 85° C. at 15 mm. pressure. Part of the distillate crystallized immediately after distilling. It melted at 41° C. to 44° C. Upon standing longer, i. e. 12 hours, a greater portion of the distillate was crystalline. These crystals melted at 104°–107° C. and melted progressively lower upon remelting, indicating a change in composition. The first distillation gave 44.1 g. of distillate. This amounts to a yield of 64.5% of theory.

The solid form gives very little color with ferric chloride whereas the liquid component gives a deep violet color. It is indicated therefore that the solid form is keto and the liquid enol.

*Example 2*

272 g. of methyl chloroacetate is dissolved in 560 cc. dry toluene and the solution is cooled to about 0° C. 158 g. of methyl formate is then added and the solution cooled to about −5° to −10° C. 142 g. of 95% sodium methylate is then added in portions, the rate being governed by the temperature of the reaction mixture. It should not exceed 5° C. for the best yields and is preferably kept at 0° C. After the sodium methylate addition, the reaction mixture is stirred for about 4 hours at 0° to 5° C. and then allowed to warm to room temperature while stirring for an additional three hours. The consistency of the sodium methyl formylchloroacetate mixture is such that it is easily stirred throughout the reaction period.

The reaction mixture is then stirred with 650 cc. of water to dissolve the sodium salt. The toluene layer is removed and washed once with approximately 150 cc. of water. It is then dried over calcium chloride for re-use. The washing is combined with the aqueous layer and the solution is neutralized with 140 cc. of concentrated hydrochloric acid or until it is at a pH of 4 to 5, to give an aqueous suspension of methyl formylchloroacetate. The methyl formylchloroacetate in the aqueous suspension can be reacted directly with thiourea without further purification to give 2-amino-5-carbomethoxythiazole as follows:

There is added to the aqueous suspension of methyl formylchloroacetate prepared above, 190 g. of thiourea. The mixture is warmed to form a complete solution, and is refluxed for two hours. With small test runs no difference in yields of the thiazole were obtained after one to five hours of refluxing. The cool solution is stirred with charcoal and filtered. It is then made slightly alkaline with ammonium hydroxide and the cream-colored precipitate of 2-amino-5-carbomethoxythiazole is filtered off and washed with water. Yield 200 g. M. P. 189–9° C. (uncor.).

In the foregoing examples, sodium methylate has been employed. It should be understood, however, that other alkali metal methylates such as for example potassium methylate can be employed instead thereof. Similarly it should be clearly understood that the temperature ranges employed are those which I have found to give the most satisfactory results. Experimentation has shown, however, that the temperature can be varied within reasonable limits and the good results still obtained.

Having thus described my invention, I claim:

1. A compound of the group consisting of methyl formylchloroacetate and alkali metal salts thereof.

2. The compound methyl formylchloroacetate.

3. The sodium salt of methyl formylchloroacetate.

4. The process of preparing methyl formylchloroacetate which comprises reacting methyl chloroacetate with methyl formate in a toluene solution and in the presence of an alkali metal methylate.

5. The process of preparing methyl formylchloroacetate which comprises reacting methyl chloroacetate with methyl formate in a toluene solution and in the presence of sodium methylate.

6. The method of preparing methyl formylchloroacetate which comprises reacting methyl formate with methyl chloroacetate in a cold solution of toluene and in the presence of sodium methylate.

7. A process for producing methyl formylchloroacetate which comprises adding sodium methylate to a toluene solution of methyl chloroacetate and methyl formate, said reaction mixture being kept at a temperature of from 0–5° C. during the reaction period.

HERMAN ELDRIDGE FAITH.